United States Patent
Wubben et al.

(10) Patent No.: US 12,214,748 B2
(45) Date of Patent: Feb. 4, 2025

(54) ANGLE FOLDED EGRESS LADDER

(71) Applicants: Deere & Company, Moline, IL (US);
Mazzotti S.r.l., Ravenna (IT)

(72) Inventors: Thomas M. Wubben, Ankeny, IA (US); Joshua J. Fausch, Polk City, IA (US); Daniel C. Jordan, Ames, IA (US); Stefano Pantano, Padua (IT)

(73) Assignees: Deere & Company, Moline, IL (US); Mazzotti S.r.l., Ravenna (IT)

( * ) Notice: Subject to any disclaimer, the term of this patent is extended or adjusted under 35 U.S.C. 154(b) by 694 days.

(21) Appl. No.: 17/488,694

(22) Filed: Sep. 29, 2021

(65) Prior Publication Data
US 2022/0134958 A1 May 5, 2022

(30) Foreign Application Priority Data
Oct. 30, 2020 (EP) .................................... 20425045

(51) Int. Cl.
*B60R 3/02* (2006.01)
*A01D 41/12* (2006.01)

(52) U.S. Cl.
CPC ............ *B60R 3/02* (2013.01); *A01D 41/1261* (2013.01)

(58) Field of Classification Search
CPC .............................. B60R 3/02; A01D 41/1261
See application file for complete search history.

(56) References Cited

U.S. PATENT DOCUMENTS

| | | | | |
|---|---|---|---|---|
| 6,029,775 A | * | 2/2000 | Hedley | B60R 3/02 182/127 |
| 6,073,396 A | * | 6/2000 | Kietzmann | E06B 11/04 16/237 |
| 9,238,941 B2 | * | 1/2016 | Ellement | B60R 3/02 |
| 10,099,622 B2 | * | 10/2018 | Handschke | B60R 3/02 |
| 2013/0092474 A1 | | 4/2013 | Magnussen | |

OTHER PUBLICATIONS

"Agrifac releases the Condor 5 with everything you ever wanted," AFDI (https://afdj.com.au), SouthCott Complete Hydraulic Solutions, Dec. 20, 2019, 6 pages.
"New Design, Improved Performance for Agrifac's Condor 5," Sprayer (https://sprayerdemo.uk), Mar. 7, 2020, 7 pages.
Dickson, Tom, "Amazone Pantera 4502-W Self-Propelled Sprayer Review," Farms & FarmMachinery, Feb. 24, 2017, 10 pages.
Rickatson, Martin, "New 310hp engine for Horsch's Leeb self-propelled sprayers," Farmers Weekly, Aug. 8, 2019, 5 pages.

(Continued)

*Primary Examiner* — Bryan A Evans
(74) *Attorney, Agent, or Firm* — Tucker Ellis LLP

(57) ABSTRACT

A ladder for an agricultural vehicle may comprises a first frame member and a second frame member. Each frame member may have an upper portion and a lower portion. At least one foot support body may be operably connected to each of the frame members. The upper portion of each frame member may be operably connected to a frame of the agricultural vehicle. The frame of the agricultural vehicle may comprise a fore and an aft. The ladder may comprise a deployed position and an angled stowed position. The angled stowed position may comprise the first frame member and the second frame member being upward and rearward towards the aft of the agricultural vehicle frame.

20 Claims, 13 Drawing Sheets

(56) References Cited

OTHER PUBLICATIONS

"New Lemken self-propelled sprayer—Nova 14," Lemken Dealer Worldwide Top 10, 2016-2017-2018, Feb. 5, 2020, 3 pages.
European Search Report for corresponding EP Application No. 20425045.0, dated Apr. 14, 2021, 7 pages.
"Agrifac Condor self propelled sprayer model 2011 2012," YouTube. com, [Retrieved on Mar. 1, 2022], 7 pages, Retrieved from the Internet <URL: https://www.youtube.com/watch?v=4mprDnGZx3g>.
"Agrifac France Endurance 2," YouTube.com, [Retrieved on Mar. 1, 2022], 11 pages, Retrieved from the Internet <URL: https://www.youtube.com/watch?v=VCoSITIIjCA&t=13s>.

* cited by examiner

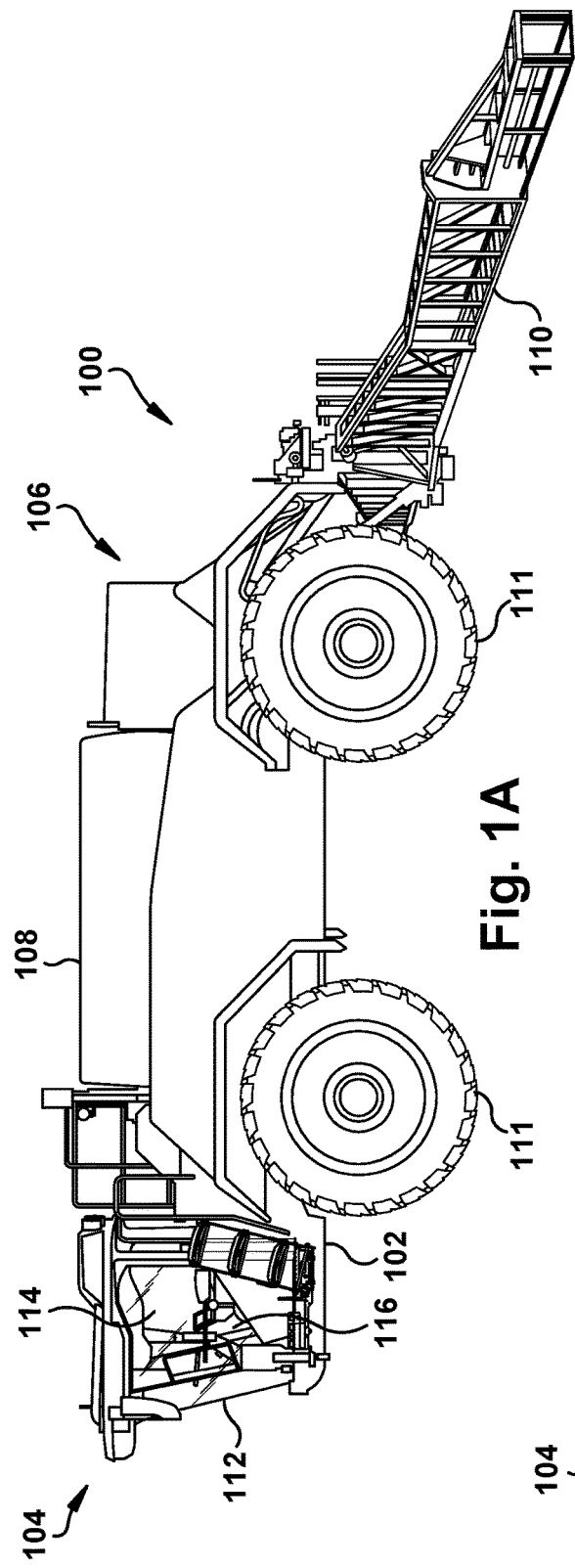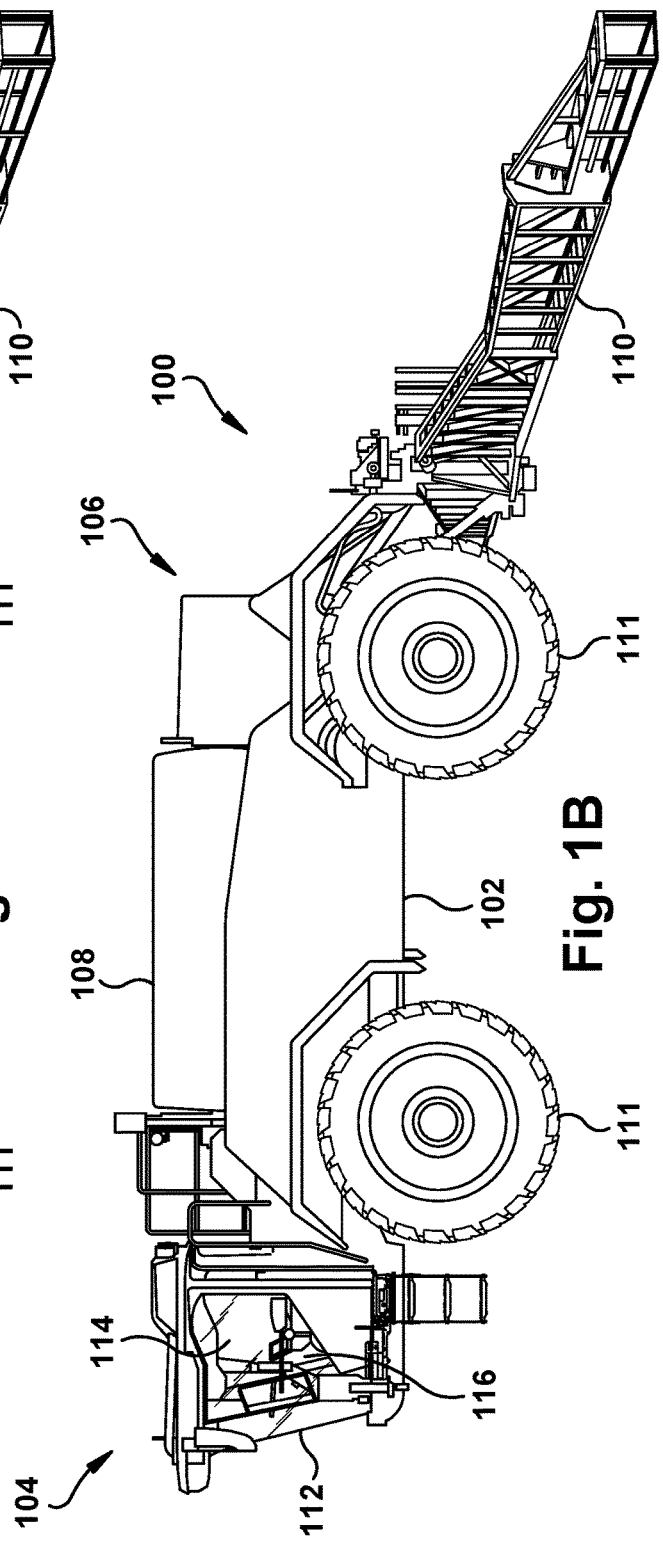

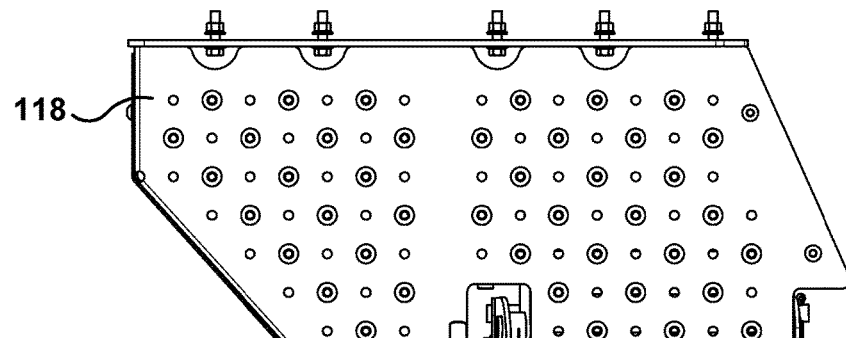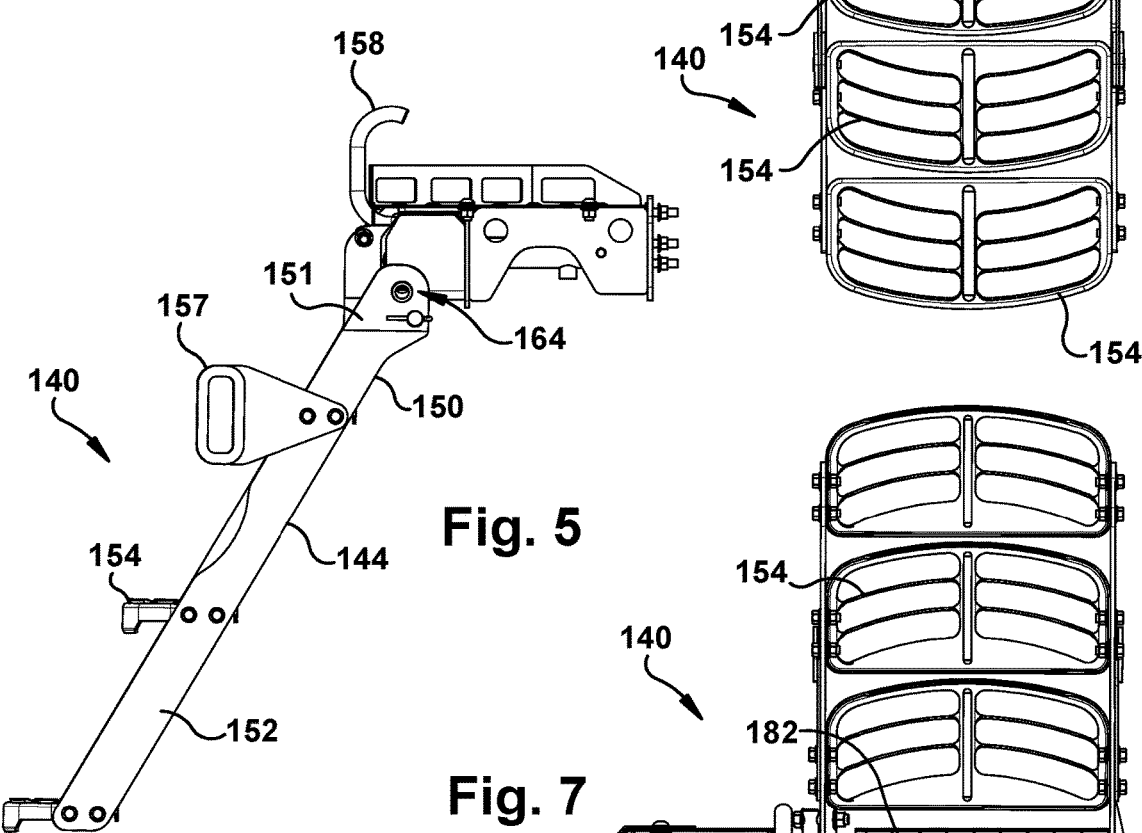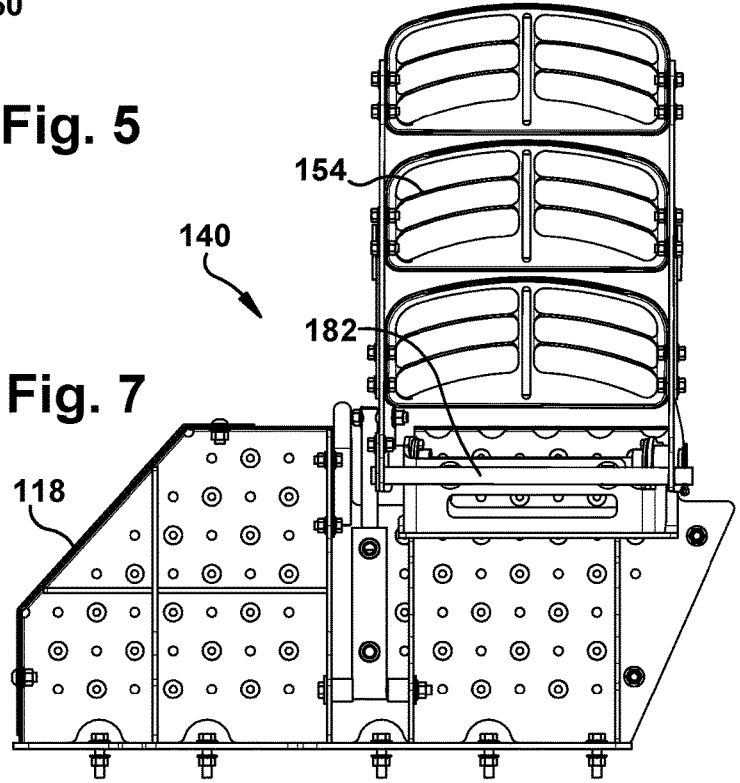

ANGLE FOLDED EGRESS LADDER

CROSS-REFERENCE TO RELATED APPLICATIONS

This application claims priority to EP Application Serial No. EP20425045.0, filed Oct. 30, 2020, which is incorporated herein by reference.

BACKGROUND

Agricultural vehicles span a wide range of purposes. Agricultural vehicles may include without limitation, sprayers, tractors, seeders, harvesters, and implements. Agricultural vehicles share roadways with other vehicles, and at times, roadways can be narrow especially in Europe. Given the size of agricultural vehicles, operators desire to have as much space in the cab as possible for controls, visibility, and comfort. Further, to obtain access into the cab and egress out of the cab, ladders may be utilized.

Agricultural vehicle ladders are often positioned in awkward locations as manufacturers balance the size, namely the width, cab location, and ingress and egress from the cab with ladders. Some ladders may be vertical relative to the frame in a deployed state, which may cause an inconvenient way for an operator to reach the ground. Further, some ladders when stowed are also in a vertical position and may cover the cab door. This may impede visibility and again causes an inconvenient way to enter and exit the cab. There is a need in the art to develop an agricultural vehicle ladder that provides for convenient ingress and egress to and from the cab, maintains cab visibility, and provides an acceptable dimension of the agricultural vehicle to travel narrow roadways.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation a ladder for an agricultural vehicle may comprise a first frame member and a second frame member. Each frame member may have an upper portion and a lower portion. At least one foot support body may be operably connected to each of the frame members. The upper portion of each frame member may be operably connected to a frame of the agricultural vehicle. The frame of the agricultural vehicle may comprise a fore and an aft. The ladder may comprise a deployed position and an angled stowed position. The angled stowed position may comprise the first frame member and the second frame member being upward and rearward towards the aft of the agricultural vehicle frame.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein:

FIG. 1A is a perspective view of an agricultural vehicle illustrating a ladder in a stowed position.

FIG. 1B is a perspective view of an agricultural vehicle illustrating a ladder in a deployed position.

FIG. 5 is a right side view taken along line 5-5 of FIG. 3.

FIG. 6 is a top view of FIG. 3.

FIG. 7 is a bottom view of FIG. 3.

DETAILED DESCRIPTION

Figure 2:
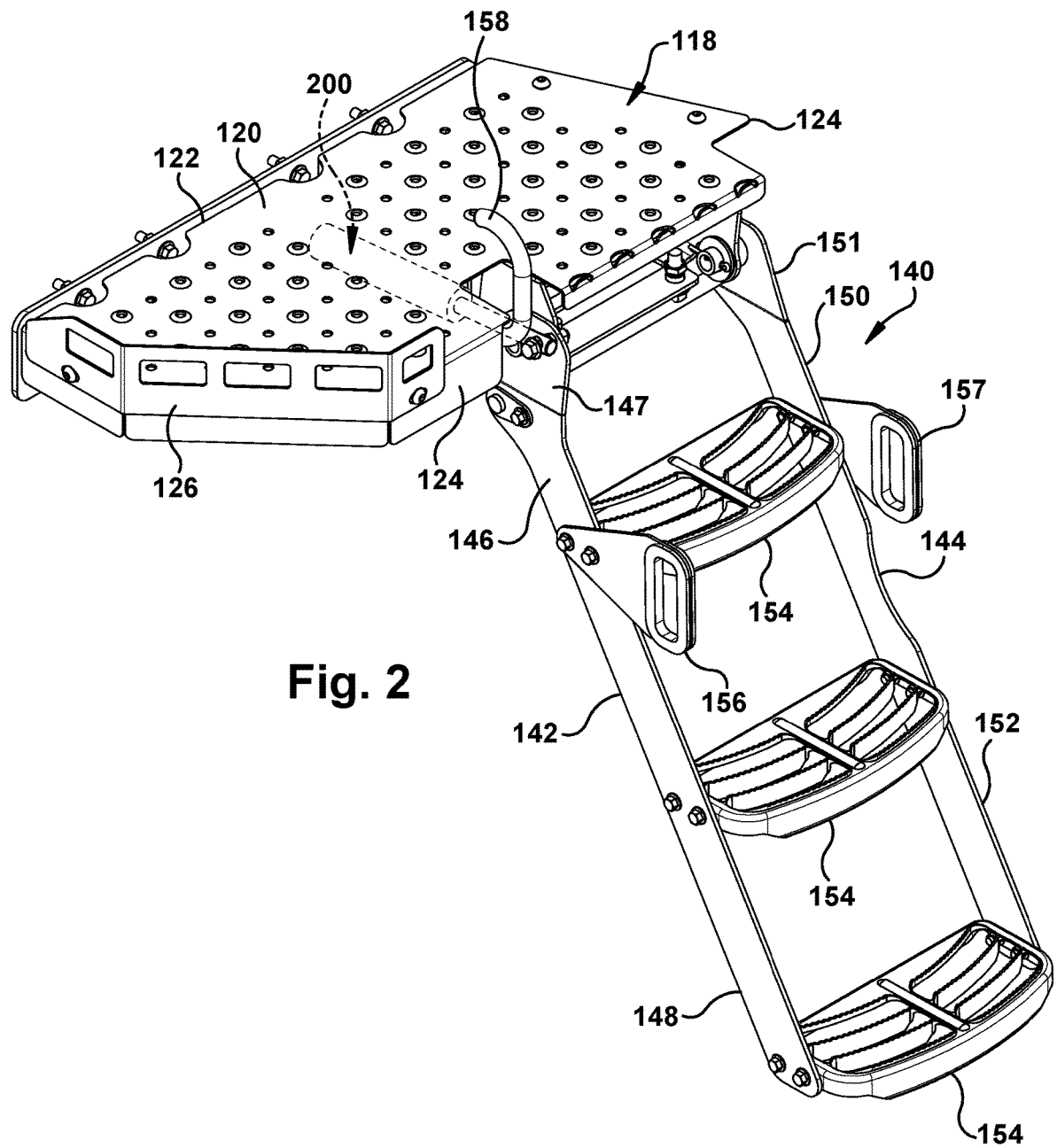
FIG. 2 is a perspective view of a portion of a ladder disclosed herein.
Figure 3:
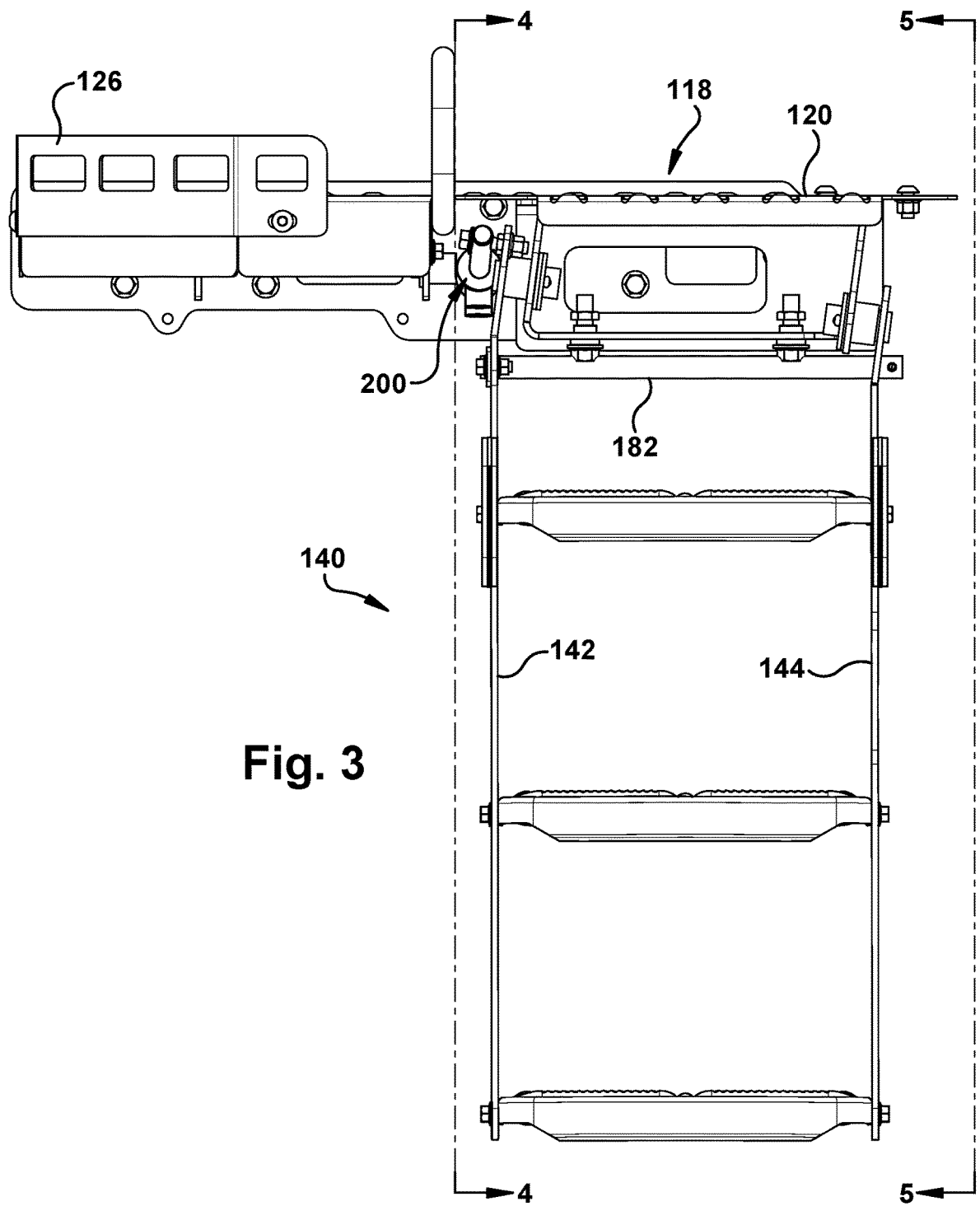
FIG. 3 is a front view of FIG. 2.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIGS. 1A and 1B illustrate an agricultural vehicle 100, which may comprise a frame 102. The frame may have a fore portion 104 towards the front of agricultural vehicle 100. The frame may also have an aft portion 106 towards the rear of the agricultural vehicle 100. In one implementation, the agricultural vehicle 100 may be a sprayer 108. In one implementation, the sprayer 108 may be a self-propelled sprayer. It should be understood that the agricultural vehicle 100 may include without limitation, sprayers, tractors, seeders, harvesters, and implements. The agricultural vehicle 100 may further comprise a boom at the aft 106. Wheels 111 are operably connected to the frame 102. The agricultural vehicle 100 may also comprise an operation station or cab 112 for the vehicle operator. The cab 112 may be disposed towards the fore portion 104 of the frame 102. In other implementations, it may be disposed about a center portion of the frame 102. The cab 112 may be positioned above the level of the wheels 111. Because the cab 112 is elevated and may be in a forward position, the operator is provided with an unobstructed view down and forward of the agricultural vehicle 100. This configuration may also provide for a larger cab space for the operator. The cab 112 may further comprise a cab opening 114 that may be selectably covered or sealed with a cab door 116. The cab door 116 may provide ingress and egress access from the inside of the cab 112.

As shown in FIGS. 2-20, the agricultural vehicle may further comprise a platform 118. The platform 118 may be operably connected to the frame 102 at a rear section 122 of platform 118. The platform 118 may comprise a generally horizontal support surface 120 to support an operator and be elevated above an underlying surface. The platform 118 may be supported on an underside by the frame 12 of the machine. The platform 118 may extend laterally outwardly from a side of the cab 112 where the cab door 116 is located. The platform 118 may have lateral edges 124 about its perimeter. A fence 126 may extend upwardly about at least a portion of the perimeter of the platform 118.

With continuing reference to the FIGURES, a ladder 140 is shown. In one implementation the ladder 140 may be operably connected to the frame 102. In another implementation, the ladder 140 may be operably connected to the platform 118, which may be operably connected to the frame 102. The ladder 140 may comprise a first frame member 142 and a second frame member 144. The first frame member 142 may have an upper portion 146 and a lower portion 148. The second frame member 144 may comprise an upper portion 150 and a lower portion 152. As shown in the drawings, the upper portions 146, 150 of the first frame member 142 and the second frame member 144, may be operably coupled to the frame 102. As previously stated, the upper portions 146, 150 of the first frame member 142 and the second frame member 144, may be operably coupled to the frame 102, and by extension operably coupled to the platform 118.

One or more foot support bodies 154 may be operably connected to the first frame member 142 and the second frame member 144. In one implementation, there may be one foot support body 154. In another implementation there may be two foot support bodies 154. In yet another implementation, there may be three foot support bodies interconnected between the first frame member 142 and the second frame member 144. The foot support body 154 may take any form chosen with sound engineering judgment including without limitation, a step, a rung, a plank, or other supportive body to support an operator's foot as they climb up or down the ladder 140.

The ladder 140 may comprise a deployed position as shown in FIGS. 1B and 2-7. Further, the ladder may have an angled stowed position as shown in FIGS. 1A and 8-13. The angled stowed position may comprise the first and the second frame members 142, 144 being upward and rearward towards the aft 106 of the agricultural vehicle frame 102. In another implementation, the angled stowed position may comprise the lower portions 148, 152 of the first and the second frame members 142, 144 being upward and rearward towards the aft 106 of the agricultural vehicle frame 102. The ladder 140 may also comprise one or more handles to support the operator. In one implementation, there may be a first handle 156 extending from the first frame member 142. In another implementation, a second handle 157 may extend from the second frame member 144. In yet another implementation, a third handle 158 may be provided that may be attached to an area of the frame 102. By way of example, the third handle may be operably connected to the platform 118. One or more of the handles 156, 157, 158 may optionally be rotatable to be stowed in closer proximation to the first frame member 142, or the second frame member 144 for storage to provide for a more compact angled stowed position for the ladder 140.

To achieve the angled stowed position, the ladder 140 may comprise an angled hinge point 160, which is illustrated in FIGS. 9, 13, 17, and 19. In one implementation, the ladder 140 may comprise a first pivot point 162 interconnecting the first frame member 142 and the agricultural vehicle frame 102. A second pivot point 164 may interconnect the second frame member 144 and the agricultural vehicle frame 102. The first pivot point 162 may be at a different axis than the second pivot point 164 when the ladder 140 is in the angled stowed position. The angled hinge point 160 may be measured between a horizontal axis H-H to the first frame member 142. In one implementation, the angled hinge point 160 may comprise an angle of about 50 degrees to about 85 degrees measured from a horizontal axis to the first frame member 142 in the stowed position. In yet another implementation, the angle formed between horizontal axis H-H and the first frame member 142 may be about 75 degrees. In one implementation, based upon the angled hinge point, the ladder 140 in the angled stowed position does not materially impede ingress or egress of the cab opening 114. It should be understood that the angle formed between the horizontal axis H-H and the first frame member 142 may be any angle chosen with sound engineering judgment if it does not materially impede ingress into our egress out of the cab opening.

Figure 16:
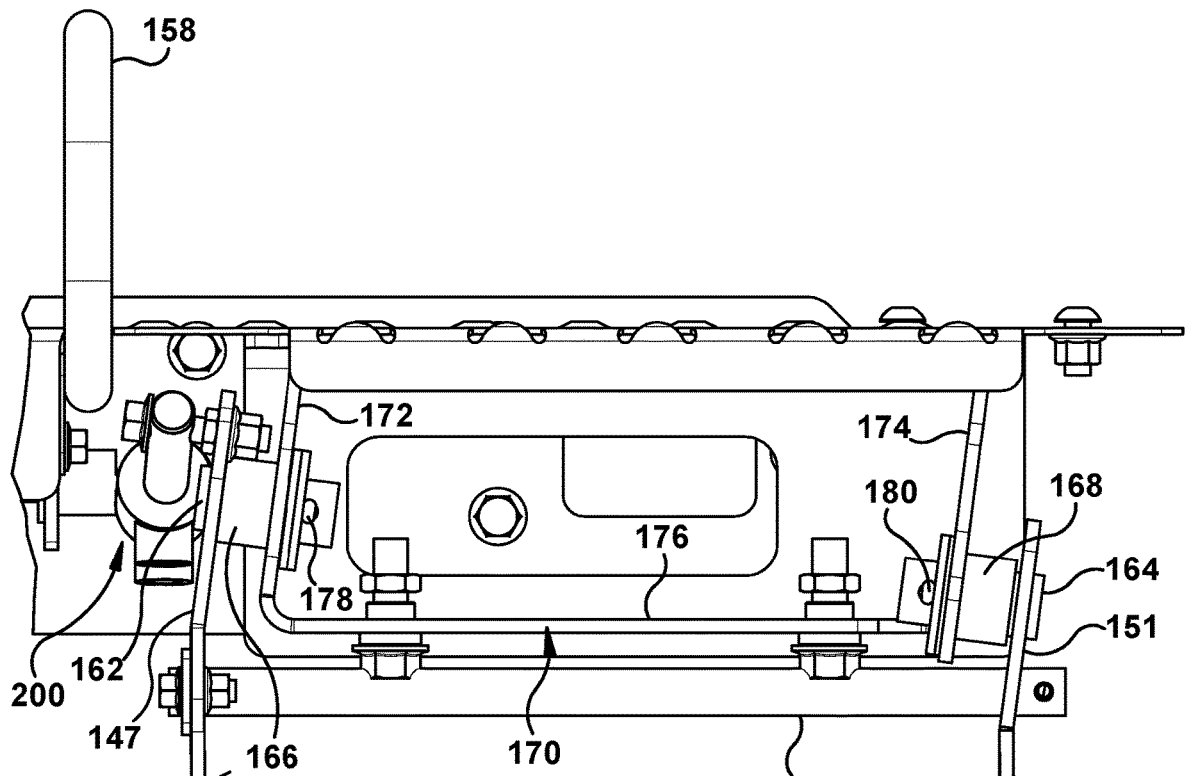
FIG. 16 is a front perspective view taken along line 16-16 of FIG. 14.
Figure 17:
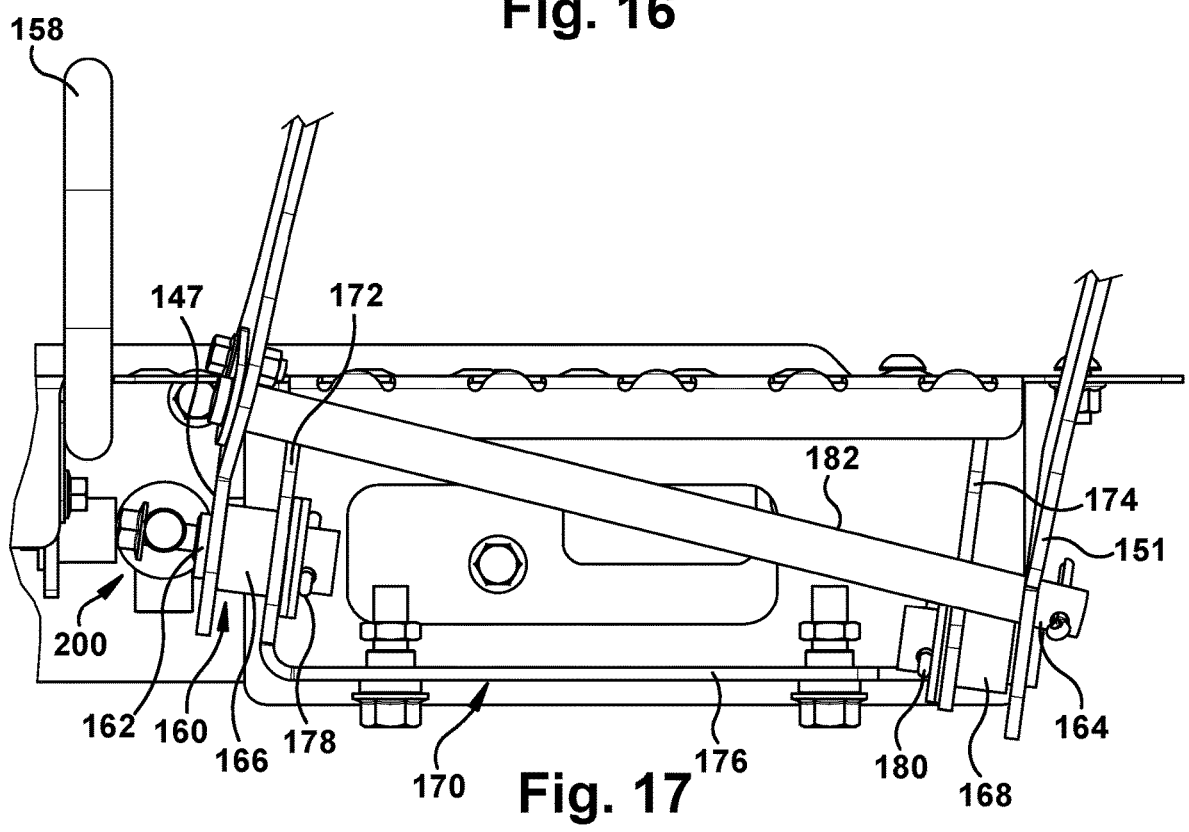
FIG. 17 is a front perspective view taken along line 17-17 of FIG. 15.
Figure 18:
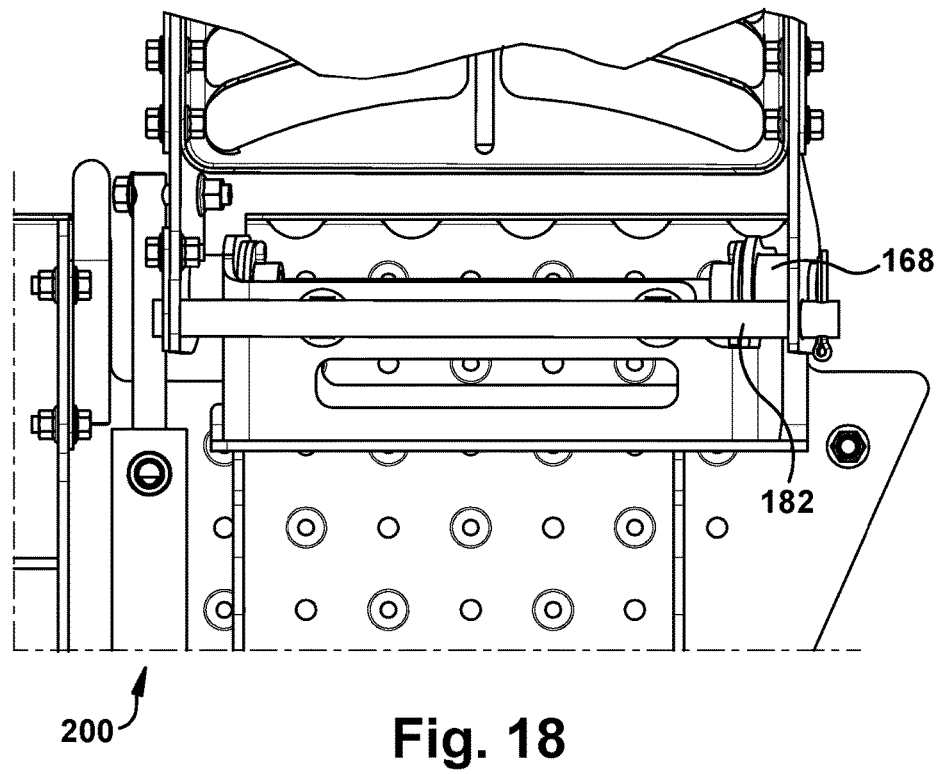
FIG. 18 is a bottom perspective view taken along line 18-18 of FIG. 14.
Figure 19:
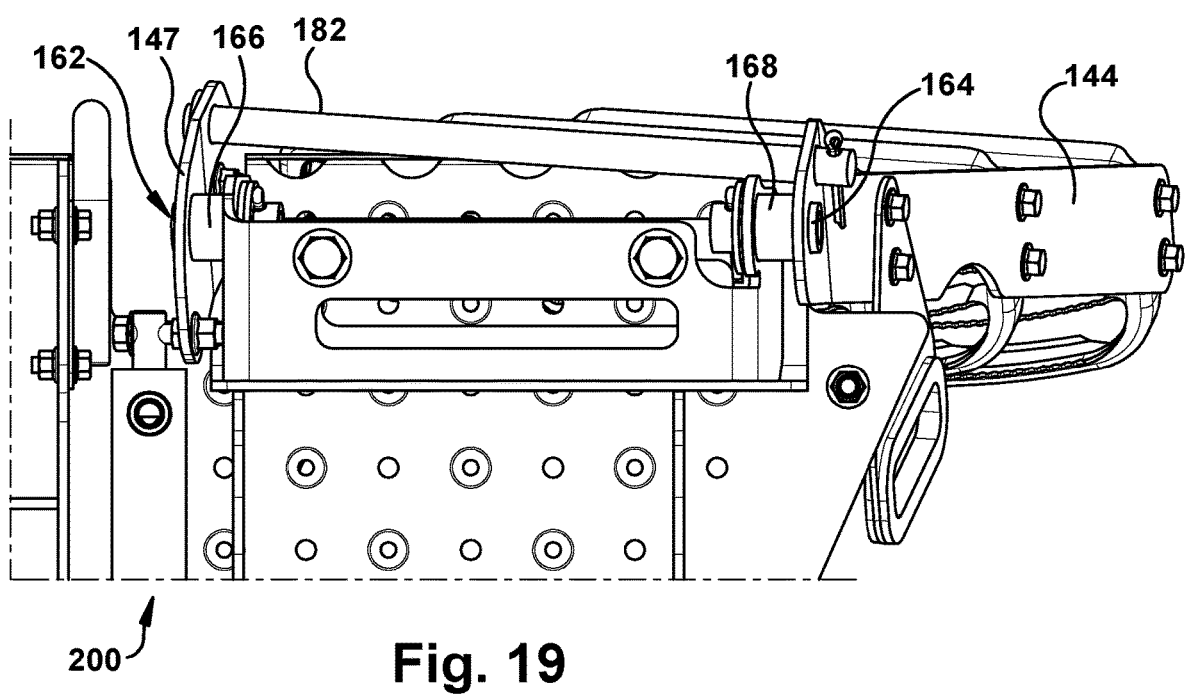
FIG. 19 is a bottom perspective view taken along line 19-19 of FIG. 15.

With continued reference to FIGS. 9, and 16-19, the first pivot point 162 and the second pivot point 164 may comprise a first rotational body 166 and a second rotational body 168, respectively. For example, bushings, bearings, or any other member or device may be utilized to provide or assist rotational movement between the ladder 140 and the frame 102. As shown in FIGS. 16 and 18, the ladder 140 is illustrated in one exemplary embodiment in the deployed position. A first linkage 170 may be operably connected to the frame 102 in one implementation. In yet another implementation, the first linkage by be operable connected to the platform 118. The first linkage may comprise a first member 172, a second member 174, and an interconnecting member 176. In one example, the first rotational body 166 and the second rotational body 168 may be operably connected to the frame 102 such as by welding or other attachment. The first rotational body 166 and the second rotational body 168 may be disposed adjacent to the first member 172 and to the second member 174 of the first linkage 170 respectively. The ladder 150 may further comprise a stop bar 182 operably connected between the first frame member 142 and the second frame member 144. In another implementation, the stop bar 182 may be operably connected to the first attachment portion 147 and the second attachment member 151. The stop bar 182 may be configured to provide a rigid member to stop the ladder 140 from rotating beyond a desired angle in the deployed position. The stop bar 182 may contact any one of a number of components of the frame 102 and/or the platform 118 to achieve the desire deployed position, such as 30 degrees from the vertical axis, for example.

The first frame member 142 may comprise a first attachment portion 147. The second frame member 144 may comprise a second attachment portion 151. The first attachment portion 147 may be disposed adjacent the first pivot point 162, such as the first rotational body 166, and then be secured by a first pin 178. The second attachment portion 151 may be disposed adjacent the second pivot point 164, such as the second rotational body 168, and then be secured by a second pin 180. Because the first pivot point 162 and the second pivot point 164 are on different axes, the first pivot point 162 is misaligned relative to the second pivot point 164. In this example implementation, this enables the ladder 140 to rotate about the first pivot point 162 and the second pivot point 164 from the non-angled deployed position in FIGS. 16 and 18 to the angled stowed position, illustrated in FIGS. 17 and 19.

Figure 4:
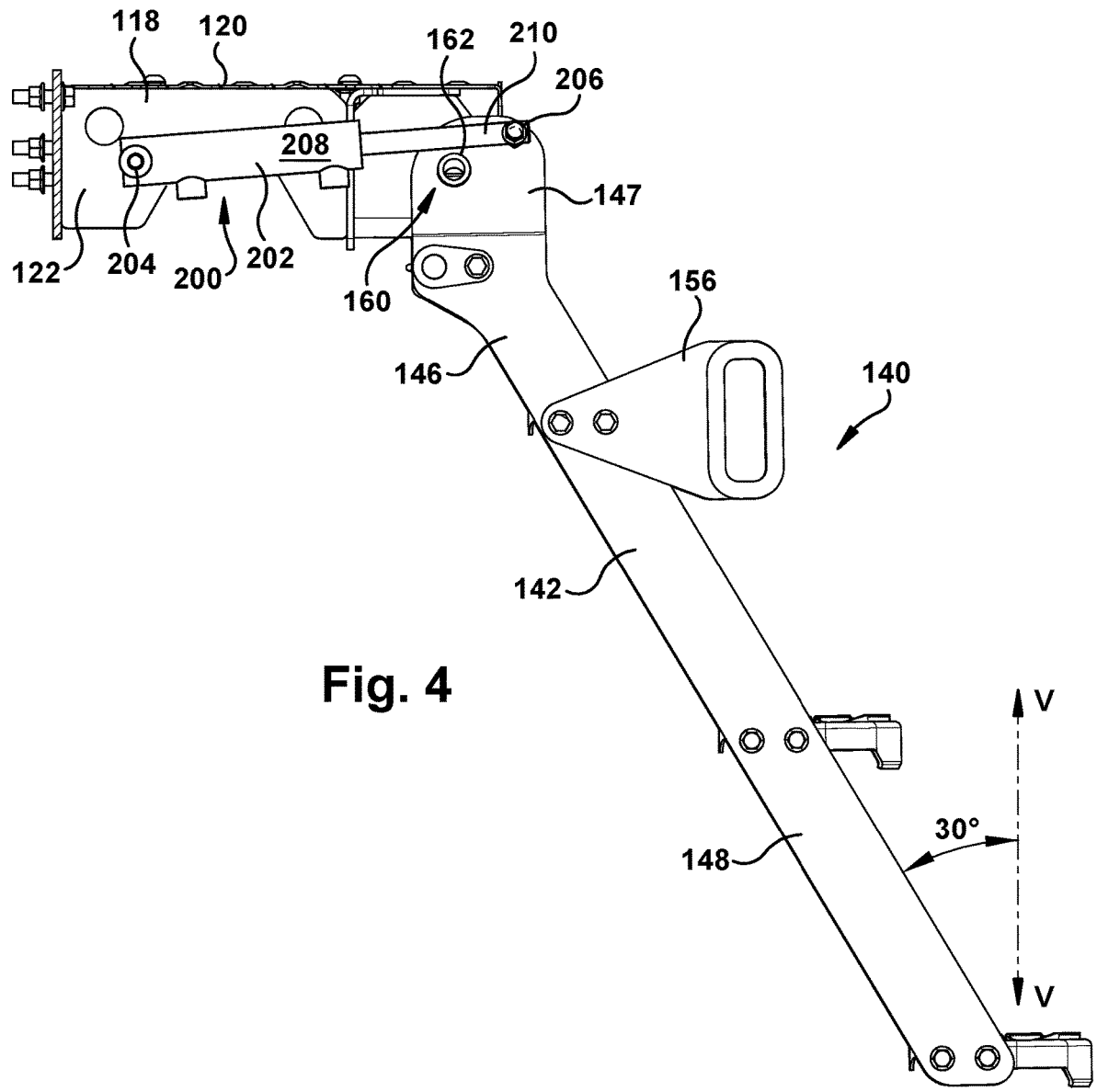
FIG. 4 is a left side view taken along line 4-4 of FIG. 3.
Figure 8:
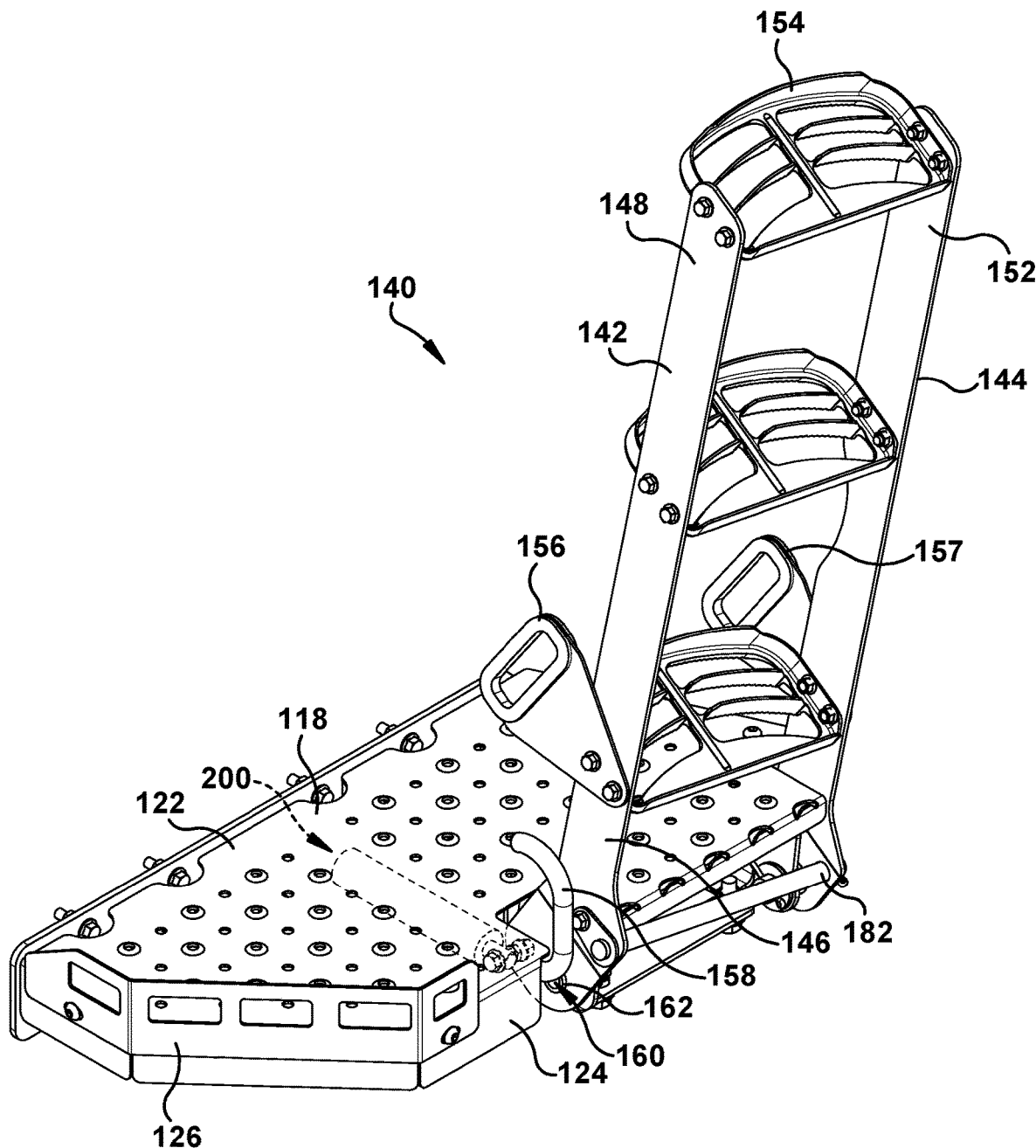
FIG. 8 is another perspective view of a portion of a ladder disclosed herein.
Figure 9:
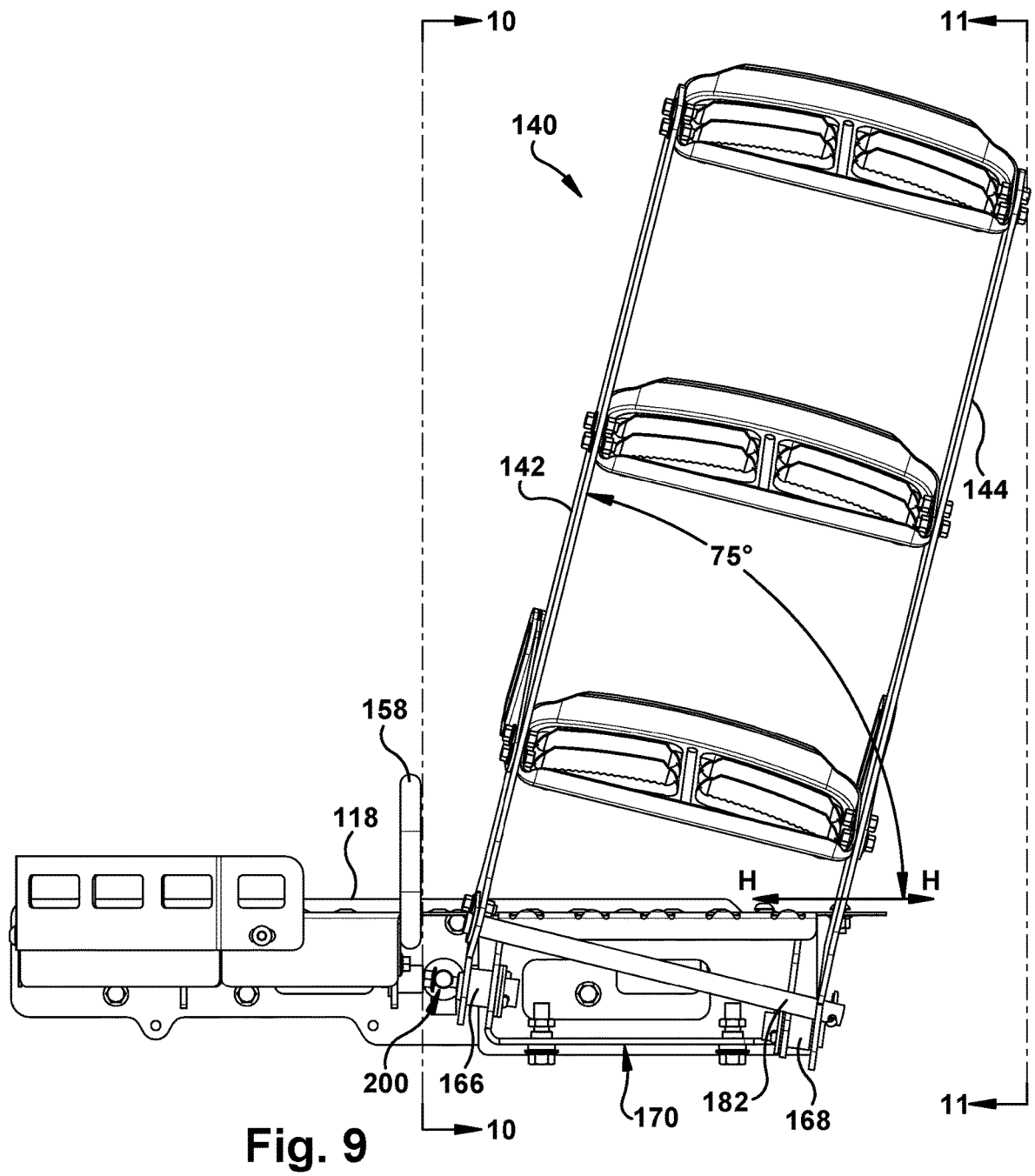
FIG. 9 is a front view of FIG. 8.
Figure 10:
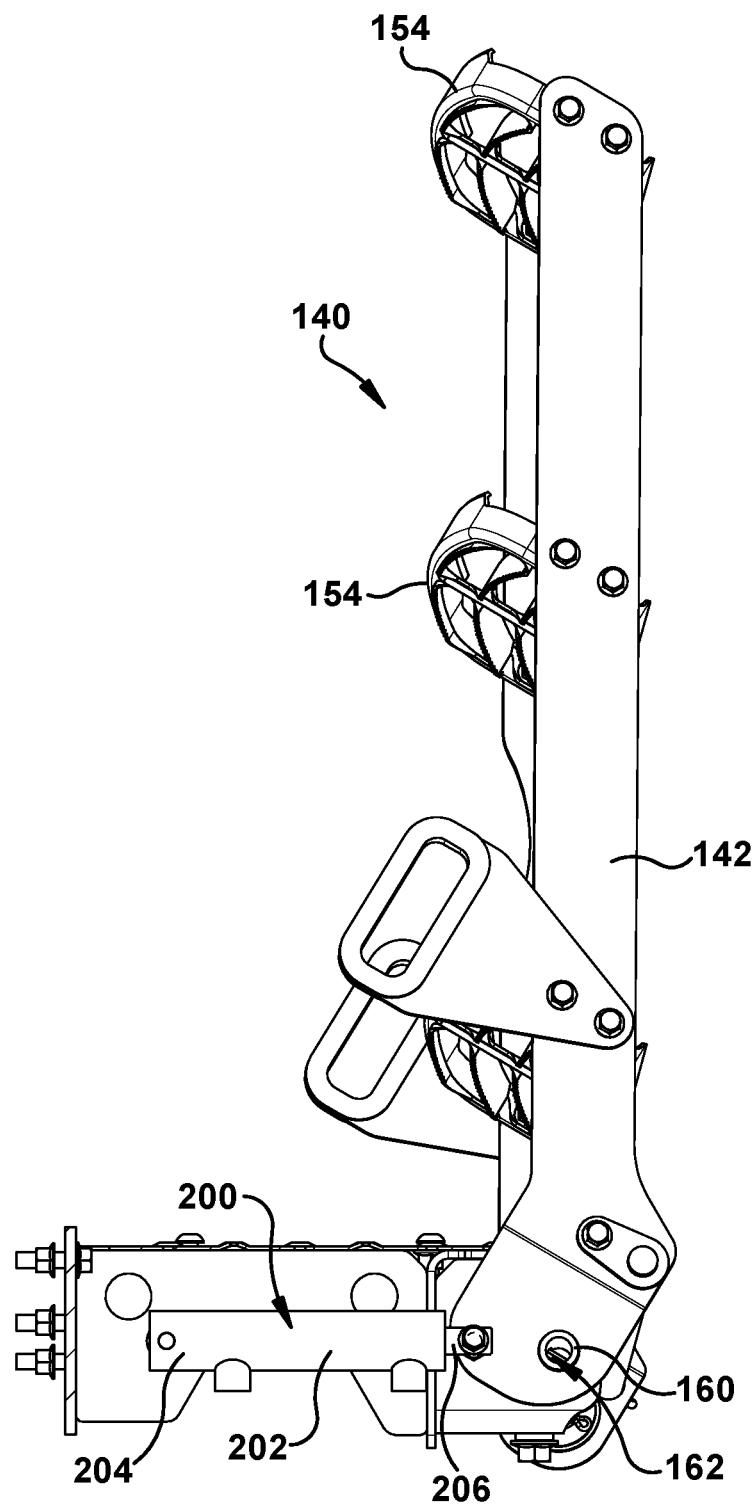
FIG. 10 is a left side perspective view taken along line 10-10 of FIG. 9.
Figure 12:
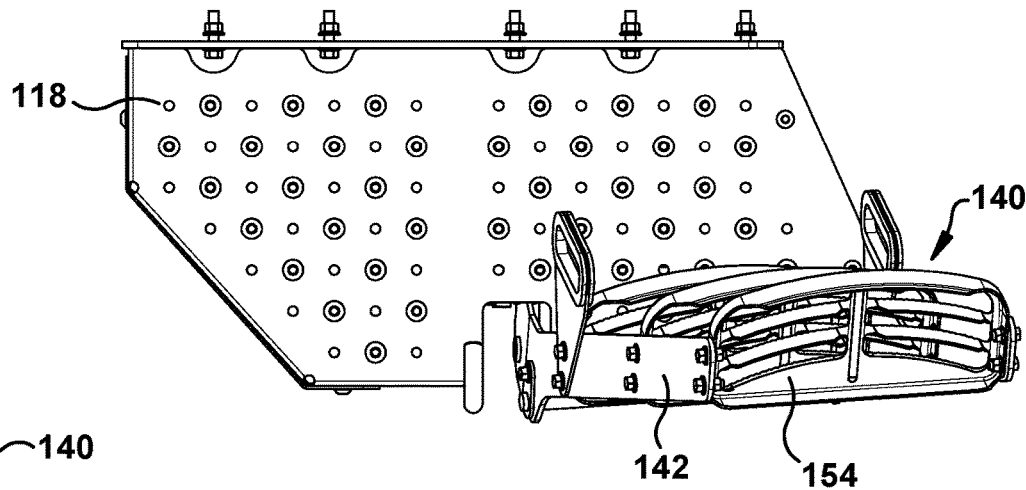
FIG. 12 is a top perspective view of FIG. 8.
Figure 11:
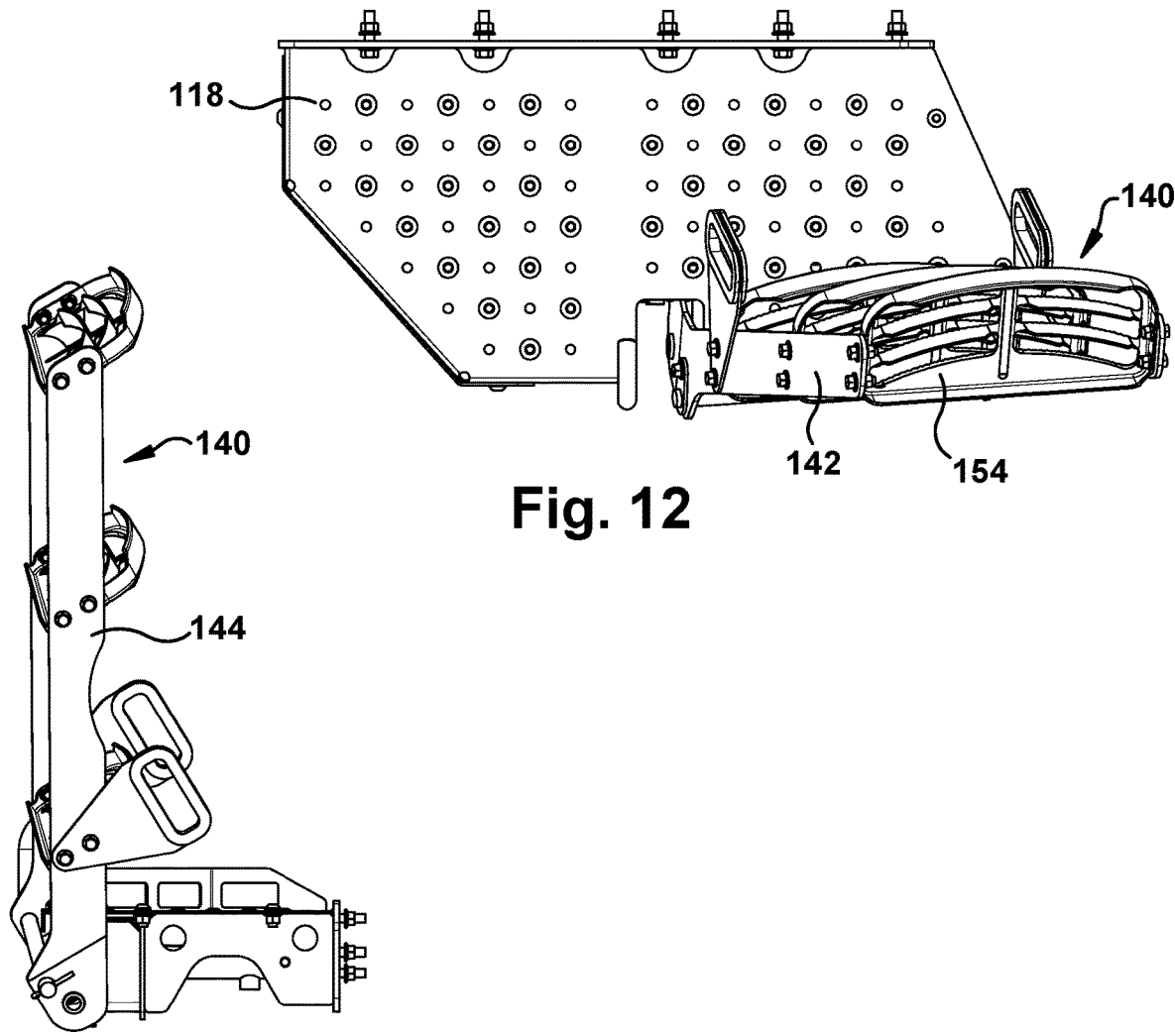
FIG. 11 is a right side perspective view taken along line 11-11 of FIG. 9.
Figure 13:
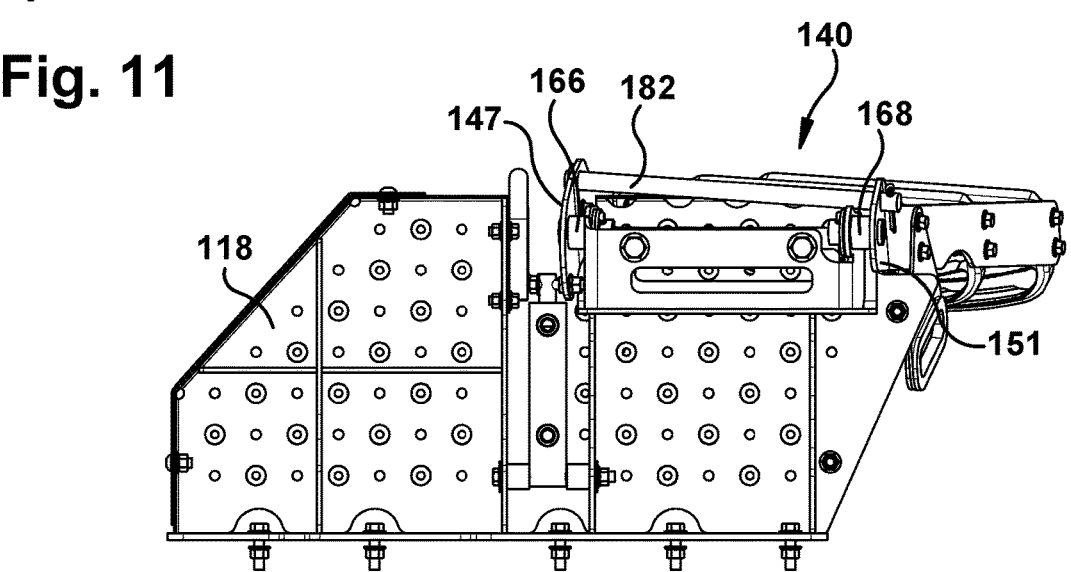
FIG. 13 is a bottom perspective view of FIG. 8.

With references to FIGS. 4 and 5, the ladder 140 is shown in a deployed position. In the deployed position, the ladder 140 may form an angle with a vertical axis V-V. In one example the angle may be measured between the vertical axis V-V and the first frame member 142. In one implementation, the angle from the vertical axis V-V to the deployed ladder 140 being between about zero degrees to about forty degrees. In another example implementation, the angle from the vertical axis V-V to the deployed ladder 140 may be between about 20 degrees to about 35 degrees. In another implementation, the angle between axis V-V and the deployed ladder 140 may have an angle resembling that of a stair case so that the operator may experience a natural climbing effect. In one such implementation, the angle between the ladder 140 in the deployed position may an angle from the vertical axis V-V to the deployed ladder may be about 30 degrees.

Figure 14:
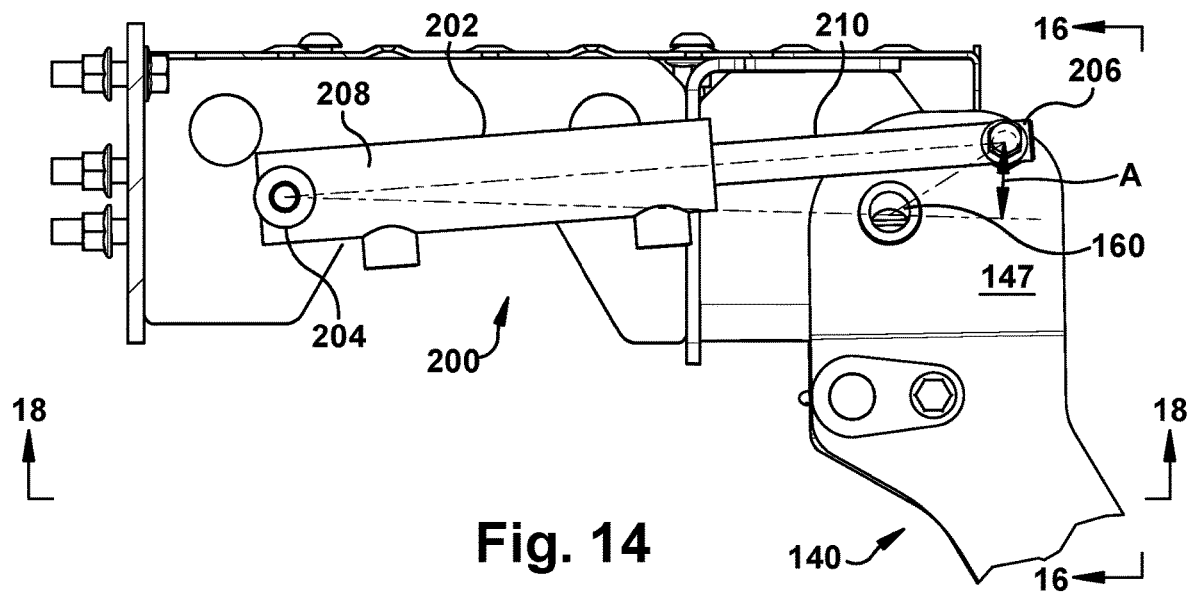
FIG. 14 is an enlarged side view of one implementation of a ladder disclosed herein.

The ladder 140 may further comprise an actuator 200 for moving the ladder 140 between the deployed position and the angled stowed position. The actuator 200 may further comprise a hydraulic cylinder 202 having a first end 204 and a distal second end 206. In one example implementation, the hydraulic cylinder may be a double acting hydraulic cylinder. A cylindrical body 208 may comprise the first end 204. A rod 210 may comprise the second distal end 206. The first end 204 may be operably coupled to the agricultural vehicle frame 102. The distal second end 206 may be operably coupled to the first frame member 142. In another implementation, the distal second end 206 may be operably coupled to the first attachment portion 147 of the first frame member 142. With reference to FIG. 14, the rod 210 is in its most fully extended position so that the ladder 140 is in the deployed position. The ladder 140 is in an intermediary position in FIG. 14A where the rod 210 is only partially deployed. With reference to FIG. 15, the rod 210 is in a retracted position so that the ladder 140 is in the angled stowed position.

Figure 14A:
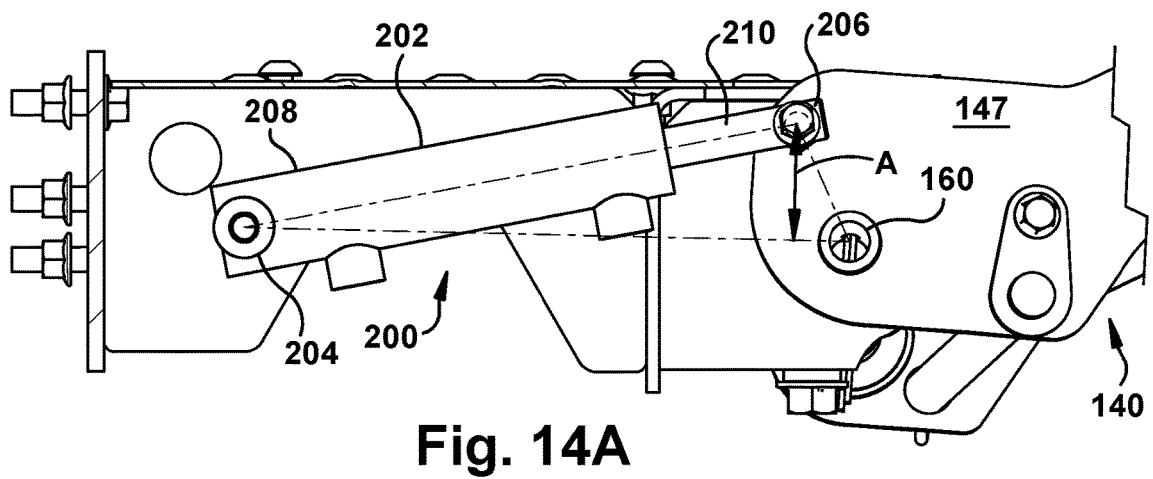
FIG. 14A is an enlarged side view of one implementation of a ladder disclosed herein.
Figure 15:
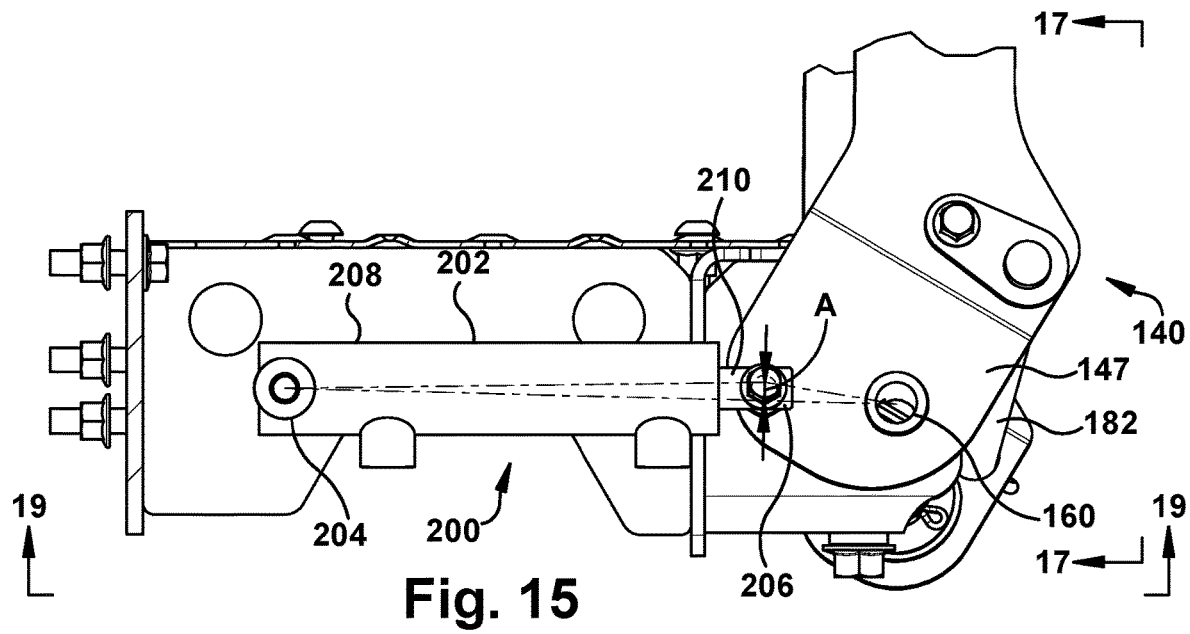
FIG. 15 is an enlarged side view of another implementation of a ladder disclosed herein.

The hydraulic cylinder 202 may comprise a virtual lever arm shown by arrow A in the deployed position of FIG. 14, angled stowed position of FIG. 15, and in the intermediary position of FIG. 14A. In one implementation, the virtual lever arm may be maintained on top of the angled hinge point 160, such as for example, the first pivot point 162, to optimize force requirements during deployment and stowing of the ladder 140. In FIG. 15, the rod 210 may be in the retracted position and the virtual lever arm may be the smallest. During deployment shown in FIG. 14A, the rod 210 exerts a force against the upper attachment portion 147 of the first frame member 142 resulting in a larger virtual lever arm above the angled hinge point 160. Once in the deployed position shown by example in FIG. 15, the rod 210 is in the fully deployed position and the virtual lever arm is larger than in the angled stowed position, but smaller than when the rod 210 is actively deploying the ladder 140. In addition, with the configuration of the virtual lever arm being positioned above the angled hinge point 160, it may prevent the ladder 140 from becoming immovable from the stowed position. The configuration of the hydraulic cylinder 202 may result in lower forces needed to deploy and stow the ladder 140 so that the hydraulic cylinder 202 the may be optimized for cost benefit.

In another implementation, the ladder 140 may be configured to move manually by the operator between the angled stowed position and the deployed position as well as from the deployed position to the angled stowed position. In another implementation, the ladder 140 may be configured to be automatically moved between the angled stowed position and the deployed position as well as from the deployed position to the angled stowed position. In such a configuration, the agricultural vehicle 100 may comprise a controller (not shown). The operator may have controls in the cab 112 in the form of a push button, for example. Upon activation of the controls, a signal is sent to the controller to activate the actuator 200, such as the hydraulic cylinder 202. The actuator 200 may then exert force on the ladder 140 to either deploy the ladder 140 or exert a force to pull on the ladder 140 to place it in the angled stowed position. In another implementation, the ladder 140 may be automatically moved to the angled stowed position upon movement of the agricultural vehicle. For example, if the ladder 140 is in the deployed position or a semi-deployed position and the agricultural vehicle 100 begins to move, the controller may send a signal to the actuator 200 to exert force on the ladder 140 to position the ladder in the angled stowed position.

Figure 20:
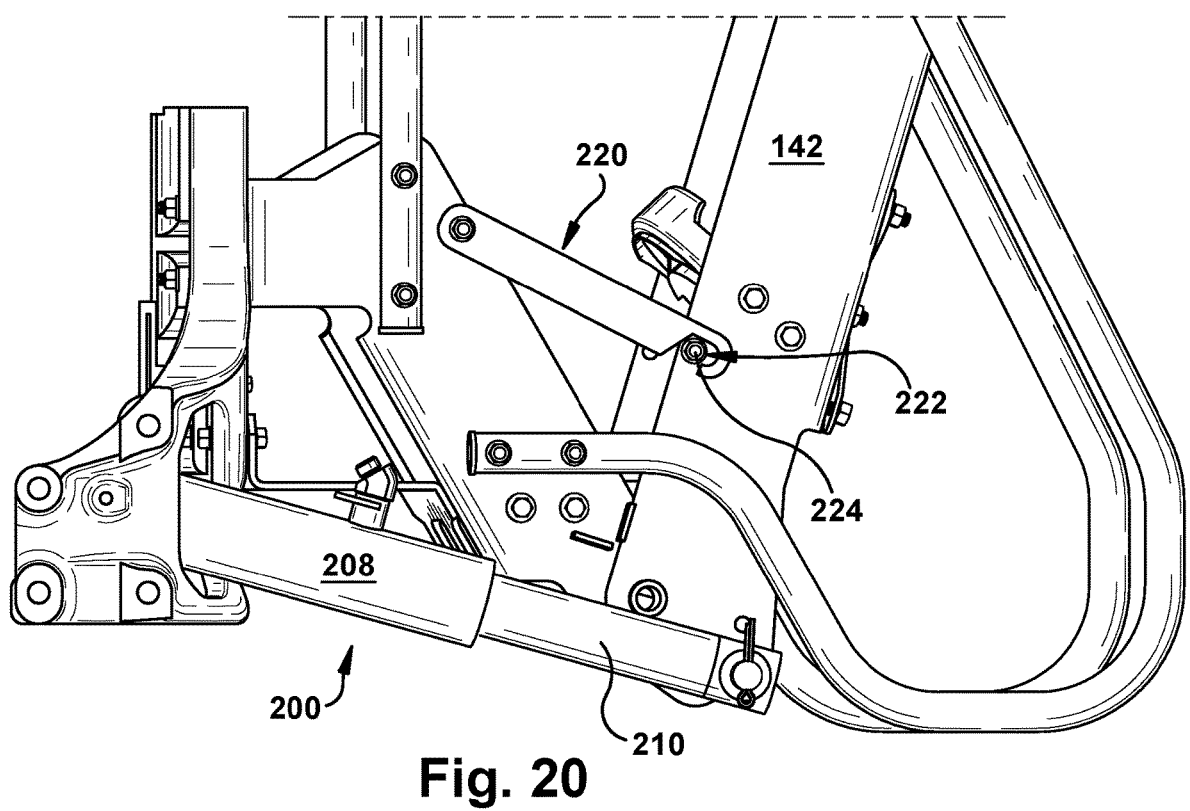
FIG. 20 in an enlarged perspective view on another implementation of a ladder disclosed herein.

As shown in FIG. 20, another example implementation of the ladder 140 illustrates a locking arm 220 having a cavity 222 at a distal end may operably engage with an extension member 224 on the ladder 140 to maintain the ladder 140 in the angled stowed position. In one implementation a first end 226 of the locking arm 220 may be operatively couple to the frame 102 or the platform 118. The extension member 224 may be disposed on the first frame member 142 of the ladder 140. The extension member 224 may be any body chosen in accordance with sound engineering judgment to engage with the cavity 222 of the locking arm. By way of example, the extension member may be a fastener, a knob, a bolt head, a pin, or other similar body.

A method for narrowly stowing the ladder 140 for the agricultural vehicle 100 between a deployed position and a stowed position is now described. The method may comprise the step of actuating the ladder 140 as previously described. The ladder 140 may be moved from a deployed position to an angled stowed position. The ladder 140 may comprise the angled hinge point 160, wherein the angled stowed position may comprise the first frame member 142 and the second frame member 144, which may be upward and rearward towards the aft portion 106 of the agricultural vehicle frame 102. The ladder 140 may rotate about the first pivot point 162 and the second pivot point 164. Because the first pivot point 162 and the second pivot point are on different axes, rotation about pivot points 162, 164 results in the ladder 140 being stowed in an angled position and then deployed in a straight position as shown in the accompanying FIGURES. In another example implementation, the first lower portion 148 of the first frame member 142 and the second lower portion 152 of the second frame member 144 may be upward and rearward towards the aft portion 106 of the agricultural vehicle frame 102. The ladder 140 may be secured in the angled stowed position. The ladder 140 may be stowed in the angled position such that it does not materially impede egress from or entrance to a cab of the agricultural vehicle 100.

In another implementation, the step of actuating the ladder 140 may comprise sensing movement of the agricultural vehicle 100. At such time, the actuator 200 may act automatically move the ladder 140 from the deployed position to the angled stowed position. In one example implementation, the agricultural vehicle 100 may further comprise the hydraulic cylinder 202 operably connected between the frame 102 and the first frame member 142 of the ladder 140. The hydraulic cylinder 202 may comprise a virtual lever arm in the deployed position, the angled stowed position and an intermediary portion. The virtual level arm may be positioned above the angled hinge point 160 at all positions. As such, the method may comprise the step preventing the ladder from becoming stuck or immovable in the angled stowed position.

When the ladder 140 is to be deployed, the actuator 200, such as the hydraulic cylinder 202 exerts force through the rod 210 against the ladder 140. The virtual lever arm exerts enough force to move the ladder 140 from the angled stowed position to the deployed position.

Because of the angled stowed position of the ladder 140, the agricultural vehicle may be constructed narrower, which may be desired for traveling narrow roadways. Further, it prevents awkward body positioning as operators enter and leave the cab 112. It also enables for a larger cab 112 and may provide greater visibility for the operator. Operators also find ergonomic use of the ladder 140 in the deployed position because it may be angled like stairs so that operators may feel a natural climb and descent when in use.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A ladder for an agricultural vehicle, comprising:
    a first frame member and a second frame member, each frame member having an upper portion and a lower portion;
    at least one foot support body operably connected to each of the frame members;
    the upper portion of each frame member operably connected to a frame of the agricultural vehicle, the frame of the agricultural vehicle comprising a fore and an aft;
    a first pivot point interconnecting the first frame member and the agricultural vehicle frame, and
    a second pivot point interconnecting the second frame member and the agricultural vehicle frame, the first pivot point being on a different axis than the second pivot point.

2. The ladder of claim 1, further comprising an angled hinge point configured to dispose the ladder in an angled stowed position.

3. The ladder of claim 2, wherein the angled hinge point is at an angle of about 50 degrees to about 85 degrees measured from a horizontal axis to the first frame member in the angled stowed position.

4. The ladder of claim 3, wherein the angled hinge point is at an angle of about 75 degrees.

5. The ladder of claim 1, wherein the agricultural vehicle further comprises a cab disposed toward the fore of the vehicle frame, the cab having an ingress and egress opening, wherein the ladder in an angled stowed position does not impede ingress or egress of the opening.

6. The ladder of claim 1, wherein the ladder in a deployed position comprises an angle from a vertical axis to the deployed ladder being between about zero degrees to about forty degrees.

7. The ladder of claim 6, where in the ladder in the deployed position comprises an angle from the vertical axis to the deployed ladder being between about twenty degrees to about 35 degrees.

8. The ladder of claim 7, wherein the ladder in the deployed position comprises an angle from the vertical axis to the deployed ladder being about 30 degrees.

9. The ladder of claim 1, wherein the ladder is configured to automatically move to an angled stowed position upon movement of the agricultural vehicle.

10. The ladder of claim 1, further comprising a hydraulic cylinder for moving the ladder between a deployed position and an angled stowed position, the hydraulic cylinder having a first end and a distal second end, the first end operably coupled to the agricultural vehicle frame and the distal second end operably coupled to an upper portion of the first frame member, the hydraulic cylinder comprising a virtual lever arm in the deployed position, angled stowed position, and in an intermediary position, the virtual lever arm configured to prevent the ladder from becoming immovable from the angled stowed position.

11. The ladder of claim 1, wherein the agricultural vehicle further comprises a cab operably connected to the agricultural vehicle frame, and a platform operably connected to the agricultural vehicle frame and adjacent the cab, wherein the ladder is operably connected to the platform.

12. A method for narrowly stowing a ladder for an agricultural vehicle between a deployed position and an angled stowed position, the method comprising the steps of:
   actuating the ladder, the ladder comprising
      a first frame member and a second frame member, each frame member having an upper portion and a lower portion;
      at least one foot support body operably connected to each of the frame members;
      the upper portion of each frame member operably connected to a frame of the agricultural vehicle, the frame of the agricultural vehicle comprising a fore and an aft;
   moving the ladder from the deployed position to the angled stowed position by pivoting the first and second frame members about pivot points being on different axes than one another, wherein the angled stowed position comprises the first frame member being upward and rearward towards the aft of the agricultural vehicle frame; and
   securing the ladder in the angled stowed position, wherein the ladder does not impede egress from or entrance to a cab of the agricultural vehicle.

13. The method of claim 12, wherein actuating the ladder further comprises:
   sensing movement of the agricultural vehicle; and,
   automatically moving the ladder from the deployed position to the angled stowed position upon movement of the agricultural vehicle.

14. The method of claim 12, wherein the agricultural vehicle further comprises a hydraulic cylinder operably connected between the frame and the upper portion of the frame member of the ladder, the hydraulic cylinder comprising a virtual lever arm in the deployed position, the angled stowed position and an intermediary position, the method further comprising the step of:
   preventing the ladder from becoming stuck in the angled stowed position.

15. The method of claim 12, wherein the ladder comprises an angle in the angled stowed position, the angle being formed between a horizontal axis and the first frame member of the ladder, the angle being about 75 degrees.

16. A ladder for an agricultural vehicle, comprising:
   a first frame member and a second frame member, each frame member having an upper portion and a lower portion;
   at least one foot support body operably connected to each of the frame members;
   the upper portion of each frame member operably connected to a frame of the agricultural vehicle, the frame of the agricultural vehicle comprising a fore and an aft;
   the ladder comprising a deployed position, an intermediary position, and an angled stowed position, wherein the angled stowed position comprises the first frame member being upward and rearward towards the aft of the agricultural vehicle frame;
   an angled hinge point comprising a first pivot point interconnecting the first frame member and the agricultural vehicle frame, and a second pivot point interconnecting the first frame member and the agricultural vehicle frame; and
   a hydraulic cylinder having a first end operably coupled to the agricultural vehicle frame and a distal second end operably coupled to an upper portion of the first frame member,
   wherein the second distal end of the hydraulic cylinder is configured to be above the angled hinge point in the deployed position, the angled stowed position, and the intermediary position to prevent the ladder from becoming immovable from the angled stowed position.

17. The ladder of claim 16, wherein the hydraulic cylinder is movable between an extended position in the deployed position, a retracted position in the angled stowed position, and a partially deployed position when the ladder is in an intermediary position between the deployed position and the angled stowed position.

18. The ladder of claim 16, wherein the first pivot point is at a different elevation than the second pivot point, wherein the angled hinged point is about 75 degrees measured from a horizontal axis to the first frame member when in the angled stowed position, and wherein the ladder in the deployed position forms an angle relative to a vertical axis, the angle being about 30 degrees.

19. The ladder of claim 1, wherein the ladder comprises a deployed position and an angled stowed position, wherein the angled stowed position comprises the first frame member being upward and rearward towards the aft of the agricultural vehicle frame.

20. The ladder of claim 19, wherein the angled stowed position is configured to unimpede an opening to a cab operably connected to the agricultural vehicle frame.

\* \* \* \* \*